Figure 1:
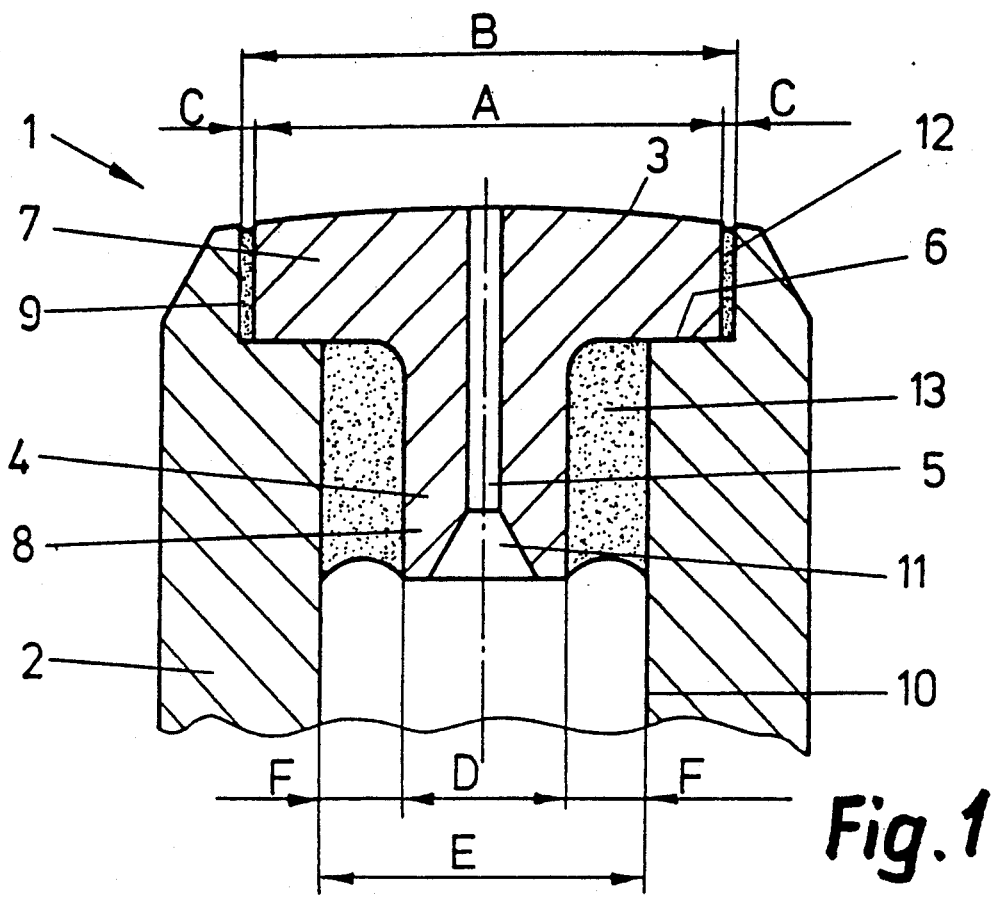

United States Patent [19]

Marazzi

[11] Patent Number: 5,013,110
[45] Date of Patent: May 7, 1991

[54] OPTICAL FIBRE END PIECE FOR AN OPTICAL FIBRE

[75] Inventor: Silvio Marazzi, Cavigliano, Switzerland

[73] Assignee: Diamond S.A., Losone, Switzerland

[21] Appl. No.: 457,837

[22] Filed: Dec. 27, 1989

[30] Foreign Application Priority Data

Jan. 10, 1989 [CH] Switzerland ............................. 71/89

[51] Int. Cl.⁵ .............................................. G02B 6/36
[52] U.S. Cl. .................................. 350/96.2; 350/96.21
[58] Field of Search ............................. 350/96.2, 96.21

[56] References Cited

U.S. PATENT DOCUMENTS

| | | | |
|---|---|---|---|
| 4,168,883 | 9/1979 | MacLeod | 350/96.2 |
| 4,707,072 | 11/1987 | Kraakman | 350/96.21 |
| 4,722,584 | 2/1988 | Kakii et al. | 350/96.2 |
| 4,778,253 | 10/1988 | Siga et al. | 350/96.21 X |
| 4,815,812 | 3/1989 | Miller | 350/96.21 |
| 4,842,363 | 6/1989 | Margolin et al. | 350/96.21 |
| 4,844,570 | 7/1989 | Tanabe | 350/96.2 |
| 4,925,266 | 5/1990 | Huebscher et al. | 350/96.2 |

Primary Examiner—John D. Lee
Assistant Examiner—Stephen W. Barns
Attorney, Agent, or Firm—Shoemaker and Mattare, Ltd.

[57] ABSTRACT

The core (4), of plastically deformable material, is supported and fastened in the hollow cylindrical outer part (2), of relatively hard material, on a supporting shoulder (6). Moreover, especially good results can be aimed for if the core (4) is slightly mushroom shaped and exhibits a disc (7) with a shank (8). The disc (7) can accommodate temperature determined dilatations especially well.

10 Claims, 1 Drawing Sheet

OPTICAL FIBRE END PIECE FOR AN OPTICAL FIBRE

The invention relates to an optical fibre end piece for an optical fibre according to the preamble of claim 1. These types of connectors are generally brought together in pairs in a common centering sleeve, whereby the optical fibers are positioned core to core at the faces of the connectors. The core, made from plastically deformable material, allows high precision centering of the optical fibre in relation to the outer part, whereby material deformation is carried out on the core with suitable upsetting tools.

Generically comparable optical fibre end pieces have been made known through, for example, EP-A-94 906 or DE-A-34 42 822. In the case of known connectors, a problem can occur in that the different materials in the core and the outer part possess different coefficients of expansion. A displacement of the optical fibre in the outer part can result from temperature fluctuations, which can be irreversible. The related inaccuracy of the fibre positioning obviously results in higher attenuation values when transmitting. The standard, basically cylindrical, cores which have been used until now can additionally, through material expansion, displace the adhesive in the adhesive gap so that it emerges at the face. On the other hand, under contraction, fractures and separation can occur which with time can even lead to loosening of the core. It is therefore a purpose of this invention to create an optical fibre end piece in accordance with the introduction, whereby the core is able to undergo dilatation caused by temperature, without a resulting radial and/or axial displacement of the optical fibre.

Additionally, the cnnection between the outer part and the core should be so formed that neither emergence of material through displacement nor cavities and fractures through contraction can occur.

This task is, according to the invention, fulfilled through an optical fibre end piece which has the features recited in the characterising portion of claim 1.

The axial supporting of the core on the outer part has the advantage that the core cannot be displaced in an axial direction. Additionally, through the firm connection at the shoulder, a constantly centered position of the axial bore is achieved, also in the case of expansion and contraction caused by temperature, and the end of the bore with the optical fibre constantly forms the extreme outer plane of the face.

It is especially advantageous if the core is fixed in the outer part with radial clearance, whereby the radial space could be filled with an elastic filler and/or adhesive. The radial clearance permits an expansion of the core within certain limits, whereby the elastic filler can conform to the movements. Since the filler no longer has its primary function as an adhesive, its composition can be optimally adapted.

In addition, further advantages will result if the supporting shoulder is formed as an annular indentation, and if the core is somewhat mushroom shaped with a disc and a shank, whereby the outer surface of the disc forms the face of the optical fibre end piece. The disc thus behaves like a diaphragm and in this way can contain the dilatations on the components especially well. The shank ensures sufficient fixing and stability of the optical fiber end portion. The outer surface of the shank serves at the same time as a contact surface for an elastic adhesive connection between the bore and the outer part.

Figure 2:
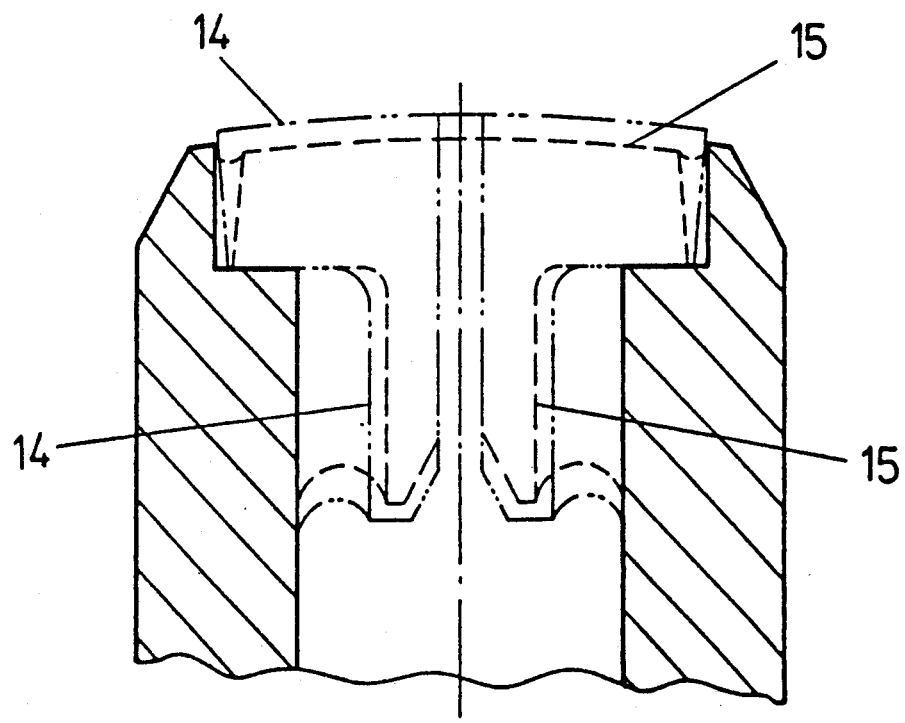

Further advantages and individual characteristic of the invention arise from the description of the following design example and from the drawings. Namely:

FIG. 1 A cross-section through the end region of an optical fibre end piece according to the invention, and FIG. 2 The optical fibre end piece according to FIG. 1 in different conditions.

FIG. 1 depicts an optical fibre end piece 1 comprising a hollow cylindrical outer part 2 of relatively hard material and a core 4 of relatively plastically material. The complete connector naturally contains further external parts, coupling nuts etc, which are not depicted here. For reasons of clarity the optical fibre itself, with its jacket, is also not shown here. The optical fibre, stripped of its jacket, is inserted into the bore 5 and subsequently positioned on the face 3 of the core 4, through a concentric deformation of the material. Further adjustments of the fibres towards a definite side are possible.

The outer part 2 is preferably of hard metal and/or cemented carbide, which can be exceptionally precisely worked, and which, as a sintered material, possesses a relatively low coefficient of thermal expansion. In place of hard metal and/or cemented carbide, however, other relatively hard materials can in certain cases be employed, such as for example, hardened steel, ceramic or other sintered materials. The plastically deformable core is preferably of a non-ferrous alloy such as, for example, nickel-silver. The face 3 is somewhat convex shaped, so that on a joined connector, practically only the fibre faces are in contact.

As depicted, the core 4 is somewhat mushroom shaped and has a disc 7 with a shank 8 extending from it on the inner side of the connector. The disc 7 rests on a supporting shoulder 6, which is formed as an annular ring shaped indentation with a side wall 9 in the outer part 2. The disc 7 is also completely set onto the outer part 2, so that the relatively sensitive face edge of the optical fibre end piece is encompassed by the relatively hard outer part 2. At the same time the core 4 is also protected.

The core 4 preferably attached to the supporting shoulder 6 through soldering or with adhesive. However, other firm attachment methods would also be conceivable, such as laser welding, for example, or similar. The rotationally symetrical core 4 is fixed in the hollow cylindrical outer part 2 with radial clearance. As depicted, the clearance C between the disc 7 and the side wall 9 is slightly less than the clearance F between the shank 8 and the bore 10 in the outer part 2.

The outer diameter A of the disc 7 and the inner diameter B of the side wall 9 are so selected that the disc 7 can undergo certain contractions and expansions. The cylindrical gap is filled with a sealant 12, which prevents the intrusion of moisture and microscopic particles.

However, the outer diameter D of the shank 8 is kept as small as possible, to limit expansion. The outer diameter D is in principle determined by the need for the lead-in taper 11 for the optical fiber. The length of the shank 8 is also dictated by the preterminded length of the bore 5. The cylindrical gap between the shank 8 and the bore 10 is filled with an adhesive 13, which additionally fastens the core 4 to the outer part 2. This adhesive can, however, freely expand against the inside of the connector, without causing damage.

The adhesive for fastening the core 4 onto the supporting shoulder 6 can at the same time perform the function of the sealant 12 and the adhesive 13.

For comparison, the following dimensions, as realised in a practical connector, are provided. These dimensions can naturally be varied according to requirements. The total axial length of the core 4 is approx. 2 mm, whereby the thickness of the disc 7 is approx. 0.5 mm. The outer diameter A of the disc 7 is approx. 1.8 mm and the radial clearance C is approx. 0.02 mm.

In FIG. 2, the relative positions at different temperatures are represented by the dotted lines 14 and 15. The outline 14 shows the core 4 at higher temperatures, whereby the disc 7 and the shank 8 expand. Additionally, the disc 7 emerges slightly above the side wall 9, whereby the excess is negligibly small. The outline 15 shows the core 4 at lower tempertures, at which a contraction occurs. At both extremes of temperature, however, the bore 5, and with it the optical fibre, remains exactly in the centre of the outer part 2, so that attenuation losses cannot occur. The elastic fillers 12 and 13 conform to the dilatations, without interfering swelling and such like occuring on the face 3.

I claim:

1. An optical fiber end piece (1) for an optical fiber, comprising a hollow cylindrical outer part (2) of a relatively hard material having an end portion, which serves as a connection to a similar optical fiber end piece, and a core (4) of plastically deformable material mounted within said end portion, said core having a coaxial bore (5) in which an optical fiber can be fixed, said outer part having a supporting shoulder (6), the core resting upon said supporting shoulder in such a way that there is radial clearance between the core and the outer part, the core being supported axially at the supporting shoulder only, said core being firmly connected to the outer part at least at the supporting shoulder.

2. An optical fiber end piece according to claim 1, wherein said radial clearance is filled with an elastic material (12,13).

3. An optical fiber end piece according to claim 1 to 2, wherein the supporting shoulder (6) is formed as an annular counterbore having a side wall (9), and the core (4) is mushroom shaped and comprises a disc portion (7) and a shank portion (8), whereby the outside surface of the disc forms an end face (3) of the optical fiber end piece.

4. An optical fiber end piece according to claim 3, wherein the disc portion (7) of the core is set into said counterbore.

5. Optical fibre end piece according to claim 3, characterised in that the clearance (F) between the shank (8) and the bore (10) in the outer part (2) is larger than the clearance (C) between the disc (7) and the side wall (9) of the annular indentation.

6. Optical fiber end piece according to claim 1, characterised in that the outer part (2) is made of hard metal and/or cemented carbide, ceramic or other sintered materials.

7. Optical fibre end piece according to claim 1, characterised in that the core (4) is made of non-ferrous alloy.

8. Optical fibre end piece according to claim 1, characterised in that the core (4) is attached to the supporting shoulder by soldering.

9. Optical fibre end piece according to claim 1, characterised in that the core (4) is fixed to the supporting shoulder (6) with adhesive.

10. An optical fiber end piece according to claim 2, wherein said elastic material is an adhesive.

* * * * *